(12) United States Patent
Johnson et al.

(10) Patent No.: US 7,547,865 B2
(45) Date of Patent: Jun. 16, 2009

(54) OPTICAL ELEMENT MOUNT AND METHOD THEREOF FOR A GUN-LAUNCHED PROJECTILE

(75) Inventors: Gary H. Johnson, Tucson, AZ (US);
Douglas M. Beard, Tucson, AZ (US);
John A. Thomas, Tucson, AZ (US);
Rene D. Perez, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 116 days.

(21) Appl. No.: 11/761,155

(22) Filed: Jun. 11, 2007

(65) Prior Publication Data

US 2008/0302905 A1     Dec. 11, 2008

(51) Int. Cl.
*F42B 15/01*     (2006.01)
*F42B 15/10*     (2006.01)
*F41G 7/00*     (2006.01)
*F42B 15/00*     (2006.01)

(52) U.S. Cl. ............... 244/3.1; 244/3.15; 244/3.16; 244/117 R; 244/119; 244/121; 359/894; 359/896

(58) Field of Classification Search ........... 244/3.1–3.3, 244/117 R, 119, 121; 89/1.11, 17; 343/872, 343/873; 359/642, 811–830, 894, 896
See application file for complete search history.

(56) References Cited

U.S. PATENT DOCUMENTS

| | | | | | |
|---|---|---|---|---|---|
| 4,004,754 | A | * | 1/1977 | Cox et al. | 244/3.16 |
| 4,155,521 | A | * | 5/1979 | Evans et al. | 244/3.16 |
| 4,267,988 | A | * | 5/1981 | Rodgers | 244/3.16 |
| 4,678,142 | A | * | 7/1987 | Hirschfeld | 244/3.16 |
| 5,201,895 | A | * | 4/1993 | Grosso | 244/3.16 |
| 6,212,989 | B1 | | 4/2001 | Beyer et al. | |
| 6,456,240 | B1 | * | 9/2002 | Cesulka | 244/3.1 |
| 6,764,041 | B2 | * | 7/2004 | Oron | 244/3.16 |
| 2005/0270669 | A1 | * | 12/2005 | Johnson et al. | 359/813 |

OTHER PUBLICATIONS

Jerry D. Stachiw "Design Parameters for Germanium Windows under Uniform Pressure Loading", SPIE vol. 131 Practical Infrared Optics (1978), pp. 57-72.

* cited by examiner

*Primary Examiner*—Bernarr E Gregory
(74) *Attorney, Agent, or Firm*—The Law Offices of Eric A. Gifford

(57) ABSTRACT

An optical element mount is effective in high G environments to protect brittle optical elements in which tensile stresses are generated on surface S2 without degrading optical performance. A flexible spacer formed of a relatively low-stiffness material supports an optical element having a tapered outer periphery in an optical seat having a complementary tapered surface. When the optical assembly is exposed to the high G environment, the inertial loading drives the optical element in the aft direction into the flexible spacer and seat. This puts the optical element into a plate bending condition thereby inducing tensile stress on S2 which is at least partially offset by a compressive stress caused by the reaction force normal to the tapered interface. The stresses, both compressive and tensile, placed on the optical element in the high G environment can be very large. In the absence of the tapered mount and flexible spacer, the tensile stress placed on S2 would likely fracture or shatter the brittle optical element. When the inertial loading is removed, the optical element returns to its initial unstressed position.

27 Claims, 4 Drawing Sheets

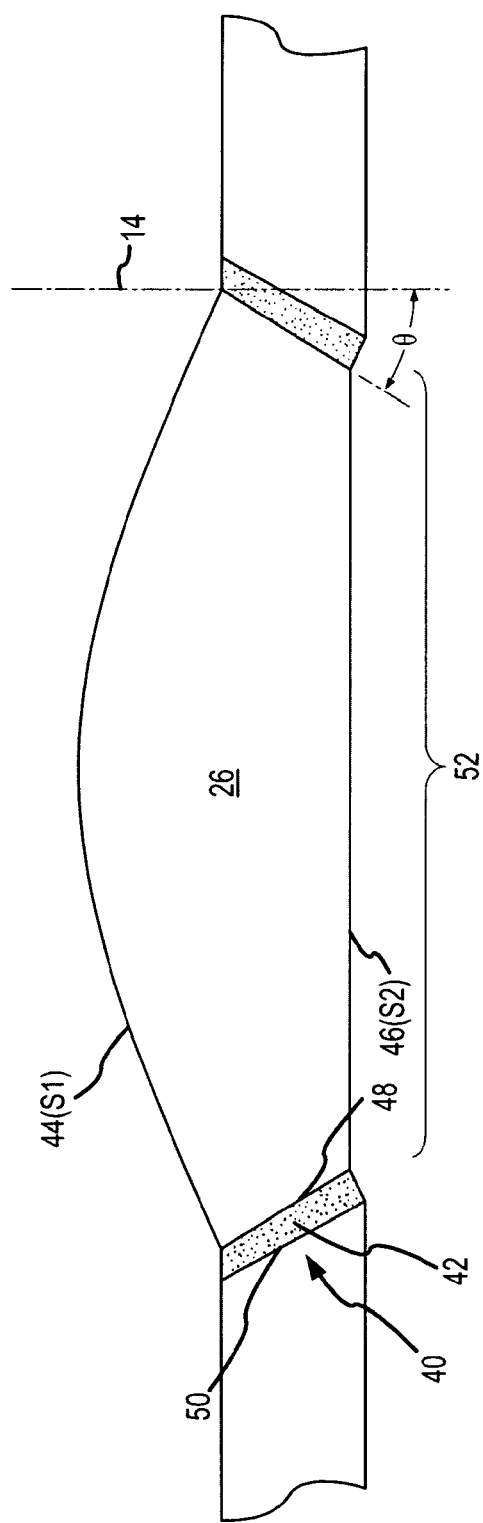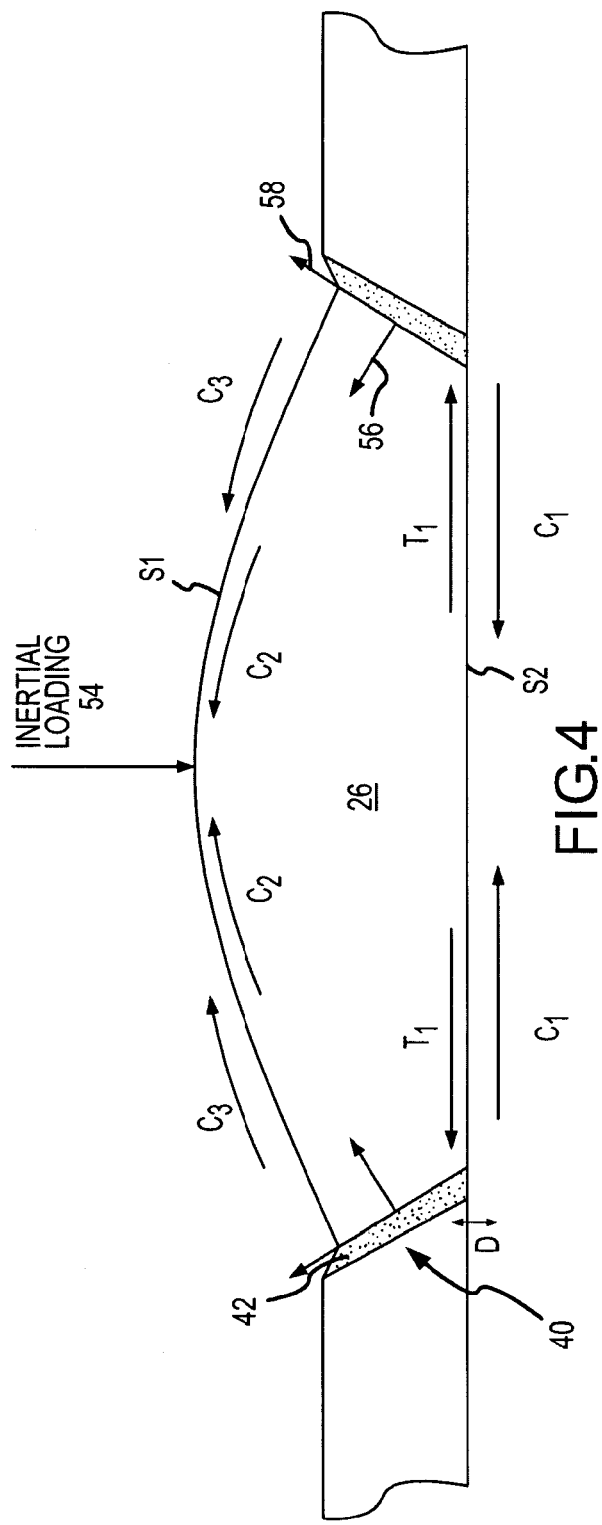

OPTICAL ELEMENT MOUNT AND METHOD THEREOF FOR A GUN-LAUNCHED PROJECTILE

GOVERNMENT RIGHTS

This invention was made with United States Government support under contract DAAE30-98-C-1079 awarded by the U.S. Army, Department of Defense. The United States Government has certain rights in the invention.

BACKGROUND OF THE INVENTION

1. Field of the Invention

This invention relates to mounting optical elements and more specifically to techniques for mounting optical elements formed from brittle materials in a high G environment without compromising optical performance.

2. Description of the Related Art

Electro-optical (EO) seekers are incorporated on guided missiles to acquire a target and guide the missile through impact. The seeker may include a number of optical elements such as a dome, window(s), lens element(s), mirror(s) and a detector. The optical elements must transmit, reflect or detect certain wavelengths, depending on the nature of the target's energy source(s) the missile's seeker is designed to acquire (i.e. infrared, ultraviolet, laser, visible). Because materials which have ideal properties for optimal optical performance are oftentimes brittle, this typically results in EO seeker designs specifying the use of brittle optical elements. Brittle materials are materials that are liable to fracture when subjected to stress beyond a failure point, they have little tendency to deform before fracture, i.e. no yield strength. Brittle materials often exhibit very low tensile strength as compared to their compressive strength, typically at least a factor of two lower. Material failure occurs in a statistical manner and is characterized by a probability of failure, which is based on the level of stress and the amount of material under that stress.

A common configuration for an optical lens is to utilize an annular flat on either, or both, of its surfaces, with a straight cylindrical peripheral diameter. This allows for straight-forward manufacture and simplifies the mounting of the element. Lenses are typically secured in place by use of adhesives or by retaining them by purely mechanical means. Optical element surfaces are typically designated as S1 for the forward facing surface that the energy first enters or reflects and S2, S3, S4 and so forth for the next succeeding surface in an optical assembly). For a single lens or window, therefore, S1 and S2 are all that is required to define the element surfaces. For the present discussion, ignoring the other elements, the projectile forward facing lens surface is S1 while the aft facing surface is S2.

A rocket powered missile launch produces acceleration during the boost phase that puts conventionally mounted optical elements into a plate bending condition producing compressive stress in their forward facing surfaces and tensile stress in their aft facing surfaces. Although tensile stress can be a cause of structural failure in brittle materials, because a rocket powered missile launch typically produces peak acceleration loading of less than 30 Gs, which induces relatively low tensile stress, the brittle optical elements usually have a high probability of survival.

The military is looking to extend EO seeker capability to gun-launched projectiles, which may be exposed to accelerations in excess of 20,000 Gs when fired, causing inertial loading, also referred to as set-back. Such high inertial loading produces tensile stresses within the optical elements which may be above the failure points of their corresponding materials resulting in a low probability of survival. As a significant portion of the induced stress can be attributed to the manner in which the element is mounted, an optical element mounting configuration that is effective in protecting the brittle optical elements from damage without degrading optical performance, during high G environment exposure or thereafter, is needed to enable guided gun-launched projectiles.

Stachiw et al. "Design Parameters for Germanium Windows Under Uniform Pressure Loading", SPIE VOl. 131 Practical Infrared Optics (1978) pp. 57-72 investigated designs for brittle germanium windows exposed to uniform pressures of 10 to 20,000 psi. Stachiw noted that "Beveled edges tend to decrease the magnitude of tensile stress on low pressure face, but unfortunately their presence, as a rule, introduces high shear stresses in the conical bearing surface that tend to initiate shear cracks at that location. For this reason, windows with plane surfaces fabricated from brittle materials are generally limited to pressure less than 1000 psi, and preferably to less than 500 psi." Stachiw concluded that "Only the windows with spherical faces can readily withstand hydrostatic pressures in excess of 1000 psi. The spherical surfaces are admirably suited for resisting external pressure since only compressive membrane stresses are generated in windows with such faces". (pp. 58)

U.S. Pat. No. 6,212,989 entitled "High Pressure, High Temperature Window Assembly and Method of Making the Same" to Beyer discloses a window assembly including a truncated conical window, a truncated conical metal seal which circumferentially engages the window and a case to which the window and the seal are secured. Beyer's abstract states that "By initially seating the window assembly by means of mechanical pressing, then subjecting the window assembly to a series of successively higher transient combustion pressures, a window assembly can be fabricated which can withstand prolong service in a harsh environment such as that encountered in a large caliber artillery cannon or equivalent scientific and industrial applications." Beyer's assembly pre-compresses the window to offset the tensile stress created on the aft surface when, for example, the artillery cannon is fired. This approach is not acceptable for optical elements which need to maintain position in order to achieve acceptable performance, as in EO seekers, due to the elements changing position during the seating in process.

SUMMARY OF THE INVENTION

The present invention provides an optical element mount that is effective in high G environments to protect the brittle optical elements by reducing tensile stresses generated on aft surface S2 without degrading optical performance This is accomplished by means of an optical assembly utilizing a flexible spacer to support an optical element having a tapered outer periphery which mates to an optical seat having a complementary tapered surface. The optical element is formed of a brittle material that exhibits a low tensile strength compared to its compressive strength. The optical element includes a forward facing surface, S1, an aft facing surface, S2, such that the diameter of S2 is smaller than the diameter of S1, with an outer tapered surface connecting S1 and S2. The optical seat has a complementary tapered surface around a clear optical aperture formed there-through and configured to engage the outer tapered surface of the optical element. The flexible spacer is formed of a relatively low-stiffness material between the optical element and the optical seat to support the optical element in an initial unstressed position. When the optical assembly is exposed to the high G environment the inertial loading drives the optical element in the aft direction into the flexible spacer squeezing the element into the tapered seat. This produces a force normal to the element's tapered surface and a sheer force that resists the downward movement. These reaction forces put the optical element into a plate bending condition thereby inducing tensile stress on S2. The normal force induces a compressive stress on S2 which offsets, at least partially, the tensile stress. When the inertial loading is removed, the optical element returns to its initial unstressed position.

The stresses, both compressive and tensile, placed on the optical element in the high G environment can be very large. In the absence of the invention, the tensile stress placed on S2 would likely fracture or shatter the brittle optical element. By configuring the optical element and seat to produce the normal force in reaction to the high G loading, the compressive stress on S2 can be sufficiently large to at least partially offset the tensile stress so that the net tensile stress is less than the tensile strength of the material. EO seekers must only survive the high G environment, not operate during it. Because the compressive stress on S2 is produced in reaction to the high G loading, when the G loading is removed the induced stress in the optical element is also removed. The optical performance of many elements degrades under stress albeit compressive, tensile or sheer, particularly at the levels associated with high G environments, including levels of compressive stress required to offset the induced tensile stress.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 3 is an enlarged view of the tapered optical element supported on a low-stiffness material in the complementary tapered optical seat in an unstressed position;

FIG. 4 is an enlarged view of the tapered optical element supported on a low-stiffness material in the complementary tapered optical seat in a stressed position at launch.

DETAILED DESCRIPTION OF THE INVENTION

The present invention provides a novel optical mount and mounting method for brittle optical elements that is effective in high G environments such as gun launched projectiles. The optical mount protects the brittle optical element from failure by reducing the tensile stresses generated on the element's aft facing surface without degrading optical performance. The invention will now be described in the context of an optical assembly in an EO seeker mounted on a gun-launched projectile but it is understood that the invention is generally applicable in high G (>1000 Gs) environments in which the optical element must withstand the inertial loading imposed during the set-back phase and then return to its initial unstressed position.

Figure 1:
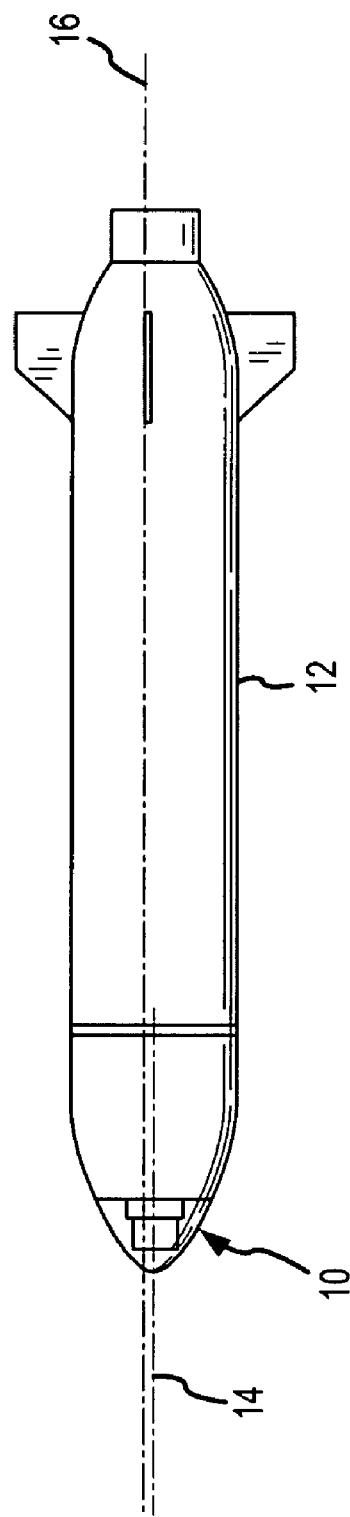
FIG. 1 is a diagram of an exemplary gun launched projectile fitted with an electro-optical seeker.

As shown in FIG. 1, an EO seeker 10 is incorporated on a gun-launched projectile 12 to acquire a target and guide the projectile through impact. The seeker may include a number of optical elements such as a dome, window(s), lens element(s), mirror(s) and a detector. The optical elements must transmit, reflect or detect certain wavelengths, depending on the nature of the target's energy source(s) the missile's seeker is designed to acquire (i.e. infrared, ultraviolet, laser, visible). At launch, the seeker's optical axis 14 is held approximately parallel to the projectile's central axis 16. During flight, the seeker may remain parallel to the axis or may be mounted on a gimbal mechanism to track the target.

Gun-launched projectiles may be exposed to accelerations in excess of 20,000 Gs when fired, causing inertial loading, also referred to as set-back. Such high inertial loading produces tensile stresses on the S2 surfaces of optical elements which may exceed the tensile strength of their corresponding materials resulting in a low probability of survival. An optical element mounting configuration that is effective in protecting the brittle optical elements from damage without degrading optical performance, during high G environment exposure, is needed to enable guided gun-launched projectiles. Depending upon the design of the element, the material used and the inertial loading, a standard mounting configuration may suffice. For example, domes or lenses whose aft surfaces only experience compressive stress while under load will have a low probability of failure.

Figure 2:
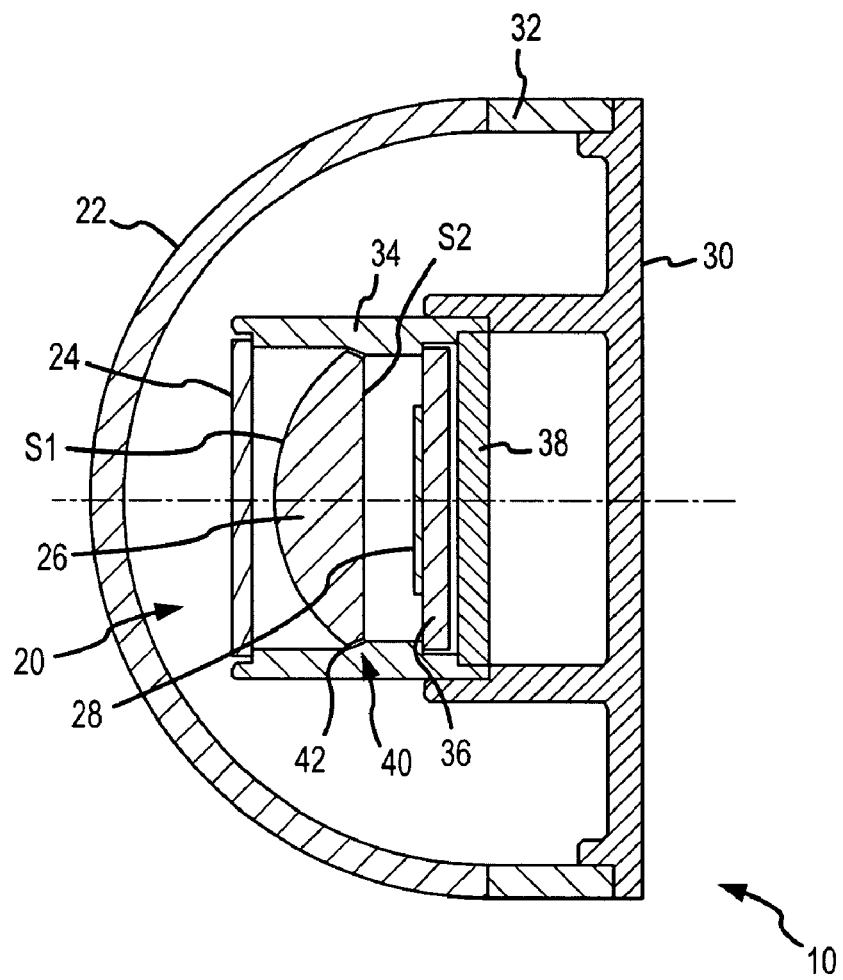
FIG. 2 is a section view of a portion of the seeker including an optical element mounted in accordance with the present invention.

A portion of EO seeker 10 is shown in FIG. 2. The illumination source e.g. laser is not shown but could also be mounted on the projectile or could be an external source. This depiction shows the essential functional elements of the seeker and an example of an optical mount for a brittle optical element in accordance with the present invention. In this simplified depiction, EO seeker 10 includes an optical assembly 20 that includes a number of optical elements such as a dome 22, a window 24, a lens 26 and a detector 28, and which is mounted on a bulkhead 30. This entire assembly may be configured to rotate on a gimbal mechanism to track the target. Any of these optical elements could be supported on a flexible spacer in a tapered seat as described in the invention. However, in this particular embodiment, only lens 26 is so supported. In this example, S1 has a convex curvature and S2 is planar. Other lens shapes may be supported as well.

The stress analysis for each element which considers the inertial loading and the mass, design and material of each element indicates that the dome, window and detector can be mounted using conventional techniques with a low probability of failure due to the induced tensile stress. Dome 22 is mounted on a dome support 32 that is attached to bulkhead 30. Window 24 has a cylindrical cross-section that fits inside an optical housing 34 that is attached to bulkhead 30. The window is held in place with an adhesive. Inertial loading will induce a plate bending condition in the window thereby inducing tensile stress on S2. However, in this particular design the induced tensile stress is less than the material's tensile strength. The detector 28, which is mounted on a circuit card assembly 36, is similarly mounted. An end cap 38, which provides additional mechanical support, is similarly mounted. If viable, the conventional techniques are typically preferred because they do not require forming the optical element and seat with complementary tapered surfaces which can be relatively expensive and which may increase the risk of sheer cracking at the interface of the forward and outer tapered surfaces.

The stress analysis for this particular embodiment indicates that the probability of failure in lens 26 using a conventional mounting is unacceptably high. The tensile stress induced on the aft S2 surface would exceed the brittle material's tensile strength. In accordance with the invention, lens 26 is shaped to have a tapered outer surface which mates to an optical seat 40 having a complementary tapered surface. The tapered outer surface and seat depict a truncated conical section because the lens periphery is circular, but the periphery shape could also be rectangular or any other shape. A flexible spacer 42 supports lens 26 in optical seat 40, which as shown in this example is formed into the interior wall of optical housing 34. When the EO seeker is exposed to the high G environment, the inertial loading drives lens 26 in the aft direction into the flexible spacer 42 squeezing the lens into seat 40. This reaction puts the lens into a plate bending condition thereby inducing tensile stress on S2. The squeezing of the lens into the tapered seat also produces a normal force on the lens' tapered outer surface producing a compressive stress on S2 that at least partially offsets the tensile stress.

FIGS. 3 and 4 illustrate lens 26 and the optical mount under unloaded and loaded conditions, respectfully. Flexible spacer 42 supports lens 26 in optical seat 40. Lens 26 is formed of a brittle material such as Zinc Sulfide (ZnS), Germanium (Ge), zinc Selenide (ZnSe), Sapphire ($Al_2O_3$), Silicon (Si), and Gallium Arsenide (GaAs). The lens or different optical elements may be made from other brittle materials well known to those in the art The brittle material has a compressive strength that is much higher than its tensile strength, typically two times or more. Lens 26 includes a forward facing surface 44, S1, an aft facing surface 46, S2, such that the diameter of S2 is smaller than the diameter of S1, with an outer tapered surface 48 (typically a truncated conical surface) connecting S1 and S2 and formed at an angle θ to axis 14. Optical seat 40 has a complementary tapered surface 50 around a clear optical aperture 52 formed there-through and configured to engage the outer tapered surface 48 of the lens.

Flexible spacer 42 is formed of a material having a relatively low stiffness modulus compared to that of the lens material. More specifically, the flexible material's Young's modulus is at most one-twentieth (1/20) the Young's modulus of the lens material, and typically much smaller so that the material deforms in reaction to the inertial loading allowing the lens to be driven into the seat and squeezed. The flexible material may be a material that provides no opposing shear force except that due to friction, i.e. a gasket, or it may be an adhesive material that provides an opposing shear force. Typical adhesives could be RTV (room temperature vulcanizing) compounds with fairly low Young's modulii in the hundreds to low thousands of psi (pounds per square inch) or epoxies with Young's modulii of up to approximately 500,000 psi. Although epoxies may be stiff when compared to RTVs, it is only the stiffness of the flexible material relative to that of the brittle optical material and the magnitude of the inertial load that is important. Under the proper conditions, the epoxy will sufficiently deform such that the lens will be driven into the seat producing the offsetting reaction forces. The less stiff the spacer material, the more the lens can be driven into the seat and "squeezed" producing a higher normal force and larger compressive stress.

As shown in FIG. 3, the optical assembly and lens 26 are not subjected to inertial loading. The flexible spacer 42 supports the lens in an initial unstressed position. Since the EO seeker is not imaging during inertial loading it is not particularly important that the optical performance be maintained other than not to damage the elements. However, it is very important that the optical performance be maintained once the inertial loading is removed. Additional stresses will most noticeably degrade surface figure—a measure of the trueness of the desired surface shape. Other parameters such as element position may also be affected. It is, therefore, very important that any stresses applied during inertial loading be removed and that no fixed stresses ('pre-stress') be used to protect the optical elements during inertial loading, as any pre-stress would remain and degrade optical performance. The combination of the complementary tapered surfaces of the optical element and seat and the flexible spacer make this possible.

As shown in FIG. 4, when the optical assembly is exposed to the high G environment, the inertial loading 54 drives lens 26 in the aft direction a distance D into the flexible spacer 42 which squeezes the lens into seat 40. This produces a force 56 normal to the element's tapered surface 48 and a sheer force 58 that resists the downward movement of the lens. These reaction forces put lens 26 into a plate bending condition producing tensile stress $T_1$ on S2 (46). The normal force 56 induces a compressive stress $C_1$ on S2 which offsets, at least partially, the tensile stress T1. The plate bending condition also produces compressive stress $C_2$ on S1 (44). Normal force 56 induces a compressive stress $C_3$ on S1 that increases the total compressive stress on S1. When the inertial loading is removed, the optical element returns to its initial unstressed position shown in FIG. 3.

Although the lens may be driven down only a very short distance, D in FIG. 4, e.g. approximately 0.001 to 0.050 inch, the stresses, both compressive and tensile, placed on the optical element in the high G environment can be very large. In the absence of the invention, the tensile stress $T_1$ placed on S2 by the plate bending condition would exceed the material's tensile strength and likely fracture or shatter the brittle optical element. By configuring the optical element and seat and selecting the spacer material to produce the compressive stress $C_1$ in reaction to the high G loading, the compressive stress $C_1$ can be sufficiently large to at least partially offset the tensile stress $T_1$ so that the net tensile stress is less than the material's tensile strength. Because the brittle material's compressive strength is much higher than its tensile strength, the increased total compressive stress on S1 remains less than the material's compressive strength.

Figure 5A:
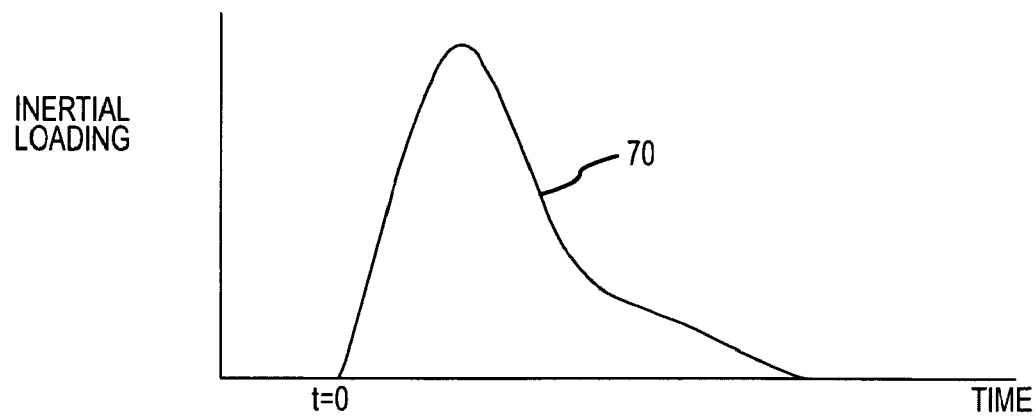
FIGS. 5a through 5c are plots of the inertial load on the optical element, net tensile stress on the aft facing (S2) surface of the element and total compressive stress on the forward facing (S1) surface of the element, respectively.
Figure 5B:
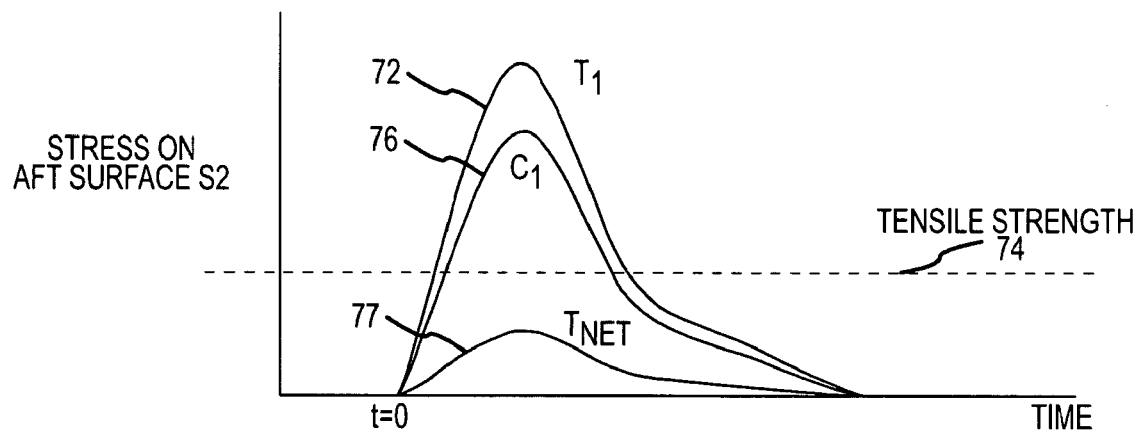
Figure 5C:
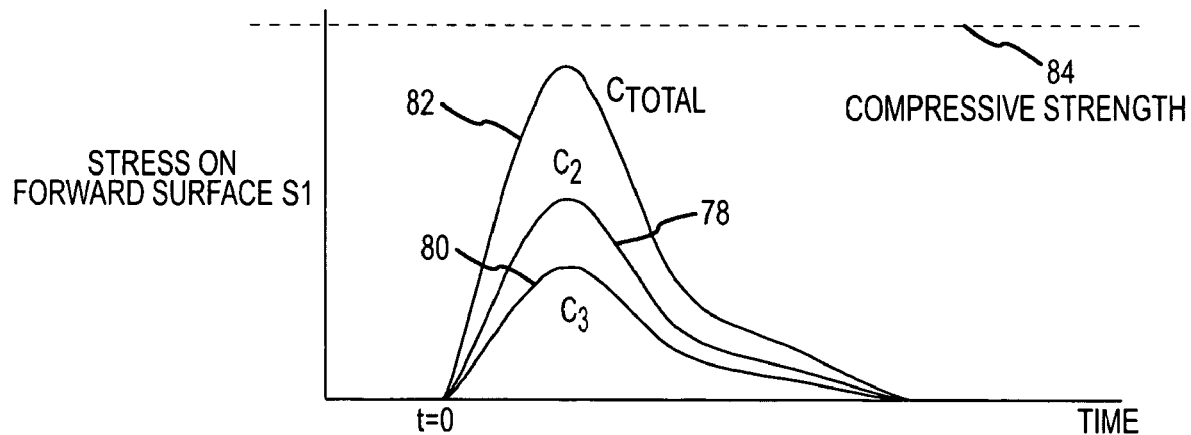

A representative firing sequence and the induced stresses on an optical element for a gun-launched projectile are illustrated in FIGS. 5a-5c. As shown, the projectile is fired at t=0. The inertial loading 70 rapidly increases to a peak value of, for example, in excess of 20,000 Gs and quickly decreases to zero. The entire loading period may be just a few milliseconds when the projectile is fired but the peak acceleration is very high. The stresses induced on the aft and forward surfaces follow the inertial loading curve. As shown, the tensile stress $T_1$ 72 on S2 caused by the inertial loading exceeds the brittle materials tensile strength 74 and would otherwise result in a high probability of failure. But the tapered optical seat and spacer produce the compressive stress $C_1$ 76 on S2 that sufficiently offsets the tensile stress so that the net tensile stress $T_{net}$ 77 is less than the material's tensile strength 74. Thus, the probability of failure due to stress in the aft surface is greatly reduced. As also shown, the sum of the compressive stress $C_2$ 78 (plate bending condition) and compressive stress $C_3$ 80 (normal force) produces a total compressive stress $C_{total}$ 82 on S1 that remains less than the material's compressive strength 84. When the inertial loading 70 is removed, the stresses on the forward and aft surfaces are also removed. As these figures clearly show, the configuration of the optical element and seat and the flexible spacer effectively addresses the problem of a very high transient G loading on the optical system without compromising optical performance.

The specific angle θ of the outer tapered surface 48 on the optical element (and mating surface of the optical seat) as shown in FIG. 2 will vary depending upon the geometry and material of the element, stiffness of the spacer material and the magnitude of high G loading that will occur in a given application. For a given application, however, the angle θ must lie within a range defined by a minimum critical angle and a maximum critical angle, where the angle is measured relative to axis 14 along which the inertial loading occurs. The critical angle may be, for example, between 5 and 85 degrees for all applications. For a given application there will typically be a narrower range in which the various factors described below are satisfied. A cylindrical element and seat would have an angle of zero degrees relative to the optical axis.

Assuming the low-stiffness material is an adhesive, if the angle θ is too small then a significant portion of the inertial loading will be absorbed as sheer stress by the adhesive. This has two possible undesirable effects. First, the sheer stress may cause the adhesive to fail if it exceeds the material's sheer strength. Second, if a large portion of the inertial load is absorbed by the adhesive the normal force 56, hence compressive stress $C_1$ may be too small. Consequently, the minimum critical angle or lower band is the angle at which either the adhesive fails or the compressive force $C_1$ is too small due to absorption as sheer stress by the adhesive to sufficiently offset the tensile stress within the element.

Conversely, if the angle θ is too large, even though the adhesive will absorb less of the inertial loading in sheer stress, the geometry of tapered surfaces will produce a smaller compressive stress $C_1$, which again may be insufficient to offset the high tensile stress. Furthermore, as the element's tapered surface angle increases, it tends towards a thin 'knife' edge shape, which increases the likelihood of 'sheer cracking' at the S1 to tapered surface interface. In other words, the interface becomes the point of failure, not the tensile stressed S2 surface. Consequently, the maximum critical angle or upper bound is the angle at which either sheer cracking occurs or the compressive force $C_1$ is too small due to the geometry.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A gun-launched projectile for use in a high G environment, comprising:
   a gun-launched projectile having a central axis along the length of the projectile; and
   an optical assembly on the projectile having an optical axis that is approximately parallel to the central axis at launch, said assembly including,
      an optical element formed from a brittle material, said optical element comprising a forward facing surface, S1, an aft facing surface, S2, such that the diameter of S2 is smaller than the diameter of S1, with an outer tapered surface connecting S1 and S2;
      an optical seat having a complementary tapered surface around a clear optical aperture formed therethrough and configured to engage the outer tapered surface of said optical element; and
      a flexible material between the mating surfaces of the optical element and the optical seat that supports the optical element in an initial unstressed position, said optical assembly configured to react to the inertial load upon launch to deform the flexible material and drive the optical element into the seat thereby producing both a bending moment that places S2 under tensile stress and a force normal to the outer tapered surface that places S2 under compressive stress that at least partially offsets the tensile stress and to react to the removal of the inertial load to return the optical element to the initial unstressed position.

2. The gun-launched projectile of claim 1, wherein the optical assembly constitutes a portion of an electro-optical seeker.

3. The gun-launched projectile of claim 1, wherein the tensile stress in S2 of the optical element produced by the bending moment exceeds the tensile strength of the brittle material, said compressive stress being sufficiently large that the net tensile stress is less than the tensile strength.

4. The gun-launched projectile of claim 3, wherein a total compressive stress on S1 of the optical element caused by the bending moment and the normal force does not exceed the compressive strength of the brittle material.

5. The gun-launched projectile of claim 4, wherein the brittle optical element has a compressive strength at least two times greater than its tensile strength.

6. The gun-launched projectile of claim 1, wherein the flexible material has a stiffness given by its Young's modulus that is at most one-twentieth (1/20) the stiffness of the brittle optical element.

7. The gun-launched projectile of claim 1, wherein the flexible material is a gasket that deforms in reaction to the inertial loading but does not provide an opposing shear force except that due to friction.

8. The gun-launched projectile of claim 1, wherein the flexible material is an adhesive that deforms in reaction to the inertial loading and provides an opposing shear force.

9. The gun-launched projectile of claim 8, wherein the tapered surfaces of the optical element and optical seat form an angle to the optical axis greater than an angle at which the shear stress on the adhesive exceeds its failure point.

10. The gun-launched projectile of claim 9, wherein the angle of the outer tapered surfaces of the optical element and optical seat is also greater than an angle at which the compressive force is too small to sufficiently offset the tensile stress.

11. The gun-launched projectile of claim 1, wherein the tapered surfaces of the optical element and optical seat form an angle to the optical axis less than an angle at which the inertial loading causes shear cracking at the interface of the forward facing and outer tapered surfaces of the optical element.

12. The gun-launched projectile of claim 11, wherein the angle of the outer tapered surfaces of the optical element and optical seat is also less than an angle at which the compressive stress is too small to sufficiently offset the tensile stress.

13. The gun-launched projectile of claim 1, wherein the outer tapered surfaces of the optical element and optical seat form an angle to the optical axis that lies in a range defined by,
   an upper bound set by the minimum of the angle at which the inertial load causes shear cracking at the interface of the forward facing and outer tapered surfaces of the optical element and the angle at which the compressive stress is too small to sufficiently offset the tensile stress, and
   a lower bound set by the maximum of an angle at which the shear stress on the material exceeds its failure point and the angle at which the compressive stress is too small to sufficiently offset the tensile stress.

14. The gun-launched projectile of claim 1, wherein the optical seat only supports the optical element along its outer tapered surface and not on S2.

15. The gun-launched projectile of claim 1, wherein the shape of S2 is such that inertial loading places S2 under tensile stress that would otherwise exceed the tensile strength of the lens material.

16. The gun-launched projectile of claim 15, wherein S2 is planar.

17. An optical assembly for use in a high G environment, comprising:
   an optical element formed of a brittle material having a compressive strength at least two times its tensile strength, said optical element comprising a forward facing surface, S1, an aft facing surface, S2, such that the overall diameter of S2 is smaller than the overall diameter of S1, with an outer tapered surface connecting S1 and S2;
   an optical seat having a complementary tapered surface around a clear optical aperture formed there-through and configured to engage the outer tapered surface of said optical element; and
   a flexible spacer between the optical element and the optical seat that supports the optical element in an initial unstressed position, said spacer formed of a material having a Young's modulus that is at most one-twentieth that of said brittle material,
   said optical assembly configured to react to the inertial load of the high G environment to drive the optical element into the flexible spacer and seat thereby producing a net tensile stress does not exceed the brittle material's tensile strength and to react to the removal of the inertial load to return the optical element to its initial unstressed position.

18. The optical assembly of claim 17, wherein the flexible material is an adhesive that deforms in reaction to the inertial loading and provides an opposing shear force.

19. The optical assembly of claim 18, wherein the tapered surfaces of the optical element and optical seat form an angle to an optical axis that lies in a range defined by,
   an upper bound set by the minimum of the angle at which the inertial load causes shear cracking at the interface of the forward facing and outer tapered surfaces of the optical element and the angle at which the compressive stress is too small to sufficiently offset the tensile stress, and
   a lower bound set by the maximum an angle at which the shear stress on the material exceeds its failure point and the angle at which the compressive force is too small due to the sheer stress on the material to sufficiently offset the tensile stress.

20. The optical assembly of claim 17, wherein the shape of S2 is such that inertial loading places S2 under tensile stress that would otherwise exceed the tensile strength of the lens material.

21. A method of mounting an optical element for use in a high G environment of a gun-launched projectile, comprising:
   providing a projectile having a central axis along the length of the projectile;
   mounting an optical assembly on the projectile that is approximately parallel to the central axis of the projectile at launch, said assembly including,
      an optical element formed of a brittle material, said optical element comprising a forward facing surface, S1, an aft facing surface, S2, such that the diameter of S2 is smaller than the diameter of S1, with an outer tapered surface connecting S1 and S2;
      an optical seat having a complementary tapered surface around a clear optical aperture formed there-through and configured to engage the outer tapered surface of said optical element; and
      a flexible spacer between the optical element and the optical seat that supports the optical element in an initial unstressed position;
   launching the projectile from a gun whereby the inertial loads drive the optical element into the flexible spacer and seat thereby producing both a bending moment that places S2 under tensile stress that exceeds the brittle material's tensile strength and a normal force on the element's outer tapered surface that that places S2 under compressive stress that at least partially offsets the tensile stress so that the net tensile stress is less than the material's tensile strength; and
   when the inertial loads are removed after launch, returning the optical element to its initial unstressed position.

22. The method of claim 21, wherein the inertial loading on the optical element exceeds 1,000 Gs.

23. The method of claim 21, wherein the brittle material has a compressive strength at least two times greater than its tensile strength.

24. The method of claim 23, wherein a total compressive stress on S1 of the optical element caused by the bending moment and the normal force does not exceed the material's compressive strength.

25. The method of claim 23, wherein the flexible spacer is formed of a material whose stiffness given by its Young's modulus is at most one-twentieth (1/20) the stiffness of the brittle material.

26. The method of claim 25, wherein the spacer material is an adhesive that deforms in reaction to the inertial loading and provides an opposing shear force.

27. The method of claim 26, wherein the outer tapered surfaces of the optical element and optical seat form an angle to the optical axis that lies in a range defined by,
   an upper bound set by the minimum of the angle at which the inertial load causes shear cracking at the interface of the forward facing and tapered surfaces of the optical element and the angle at which the compressive stress is too small to sufficiently offset the tensile stress, and
   a lower bound set by the maximum an angle at which the shear stress on the material exceeds its failure point and the angle at which the compressive force is too small to sufficiently offset the tensile stress.

* * * * *